United States Patent
Ahmadian et al.

[11] Patent Number: 6,115,658
[45] Date of Patent: Sep. 5, 2000

[54] NO-JERK SEMI-ACTIVE SKYHOOK CONTROL METHOD AND APPARATUS

[75] Inventors: Mehdi Ahmadian, Blacksburg, Va.; Brian Reichert, Lexington, Ky.; Xubin Song, Blacksburg, Va.; Steve S. Southward, Apex, N.C.

[73] Assignees: Lord Corporation, Cary, N.C.; Virginia Tech Intellectual Properties, Inc., Blacksburg, Va.

[21] Appl. No.: 09/225,147

[22] Filed: Jan. 4, 1999

[51] Int. Cl.$^7$ .................................................. B60G 17/08
[52] U.S. Cl. .......................................... 701/37; 280/5.515
[58] Field of Search ............................... 701/37; 280/5.5, 280/5.515; 248/550

[56] References Cited

U.S. PATENT DOCUMENTS

| | | | |
|---|---|---|---|
| 3,807,678 | 4/1974 | Karnopp et al. | 248/358 R |
| 4,821,849 | 4/1989 | Miller | 188/280 |
| 4,881,172 | 11/1989 | Miller | 364/424.05 |
| 4,936,425 | 6/1990 | Boone et al. | 188/299 |
| 4,953,089 | 8/1990 | Wolfe | 364/424.05 |
| 5,199,737 | 4/1993 | Huang | 280/707 |
| 5,269,557 | 12/1993 | Butsuen et al. | 280/707 |
| 5,276,622 | 1/1994 | Miller et al. | 364/424.05 |
| 5,276,623 | 1/1994 | Wolfe | 364/424.05 |
| 5,390,121 | 2/1995 | Wolfe | 364/424.05 |
| 5,488,562 | 1/1996 | Otterbein et al. | 364/424.05 |
| 5,526,262 | 6/1996 | Kimura et al. | 364/424.05 |
| 5,582,385 | 12/1996 | Boyle et al. | 248/562 |
| 5,652,704 | 7/1997 | Catanzarite | 364/424.059 |
| 5,701,245 | 12/1997 | Ogawa et al. | 364/424.046 |
| 5,712,783 | 1/1998 | Catanzarite | 364/424.046 |
| 5,832,398 | 11/1998 | Sasaki et al. | 701/37 |

*Primary Examiner*—Michael J. Zanelli
*Attorney, Agent, or Firm*—Randall S. Wayland; Michael M. Gnibus; James W. Wright

[57] ABSTRACT

A method of controlling a controllable force generator within a controllable suspension system interconnected between a first member $M_1$ and a second member $M_2$. The method includes the steps of obtaining a first signal ($V_{abs}$) representative of the absolute velocity of the first member $M_1$, obtaining a second signal ($V_{rel}$) representative of the relative velocity between the first and second members, and setting a desired damping force for the generator based upon a control policy which defines a control surface. The control policy includes a preselected gain, an absolute velocity, and a shaping function of relative velocity wherein said control surface exhibits only continuous first derivatives for $V_{rel}*V_{abs} > 0$ and wherein the control surface is devoid of any surface discontinuities. This control policy effectively eliminates the jerkiness in certain prior art control methods, such as skyhook.

19 Claims, 5 Drawing Sheets

NO-JERK SEMI-ACTIVE SKYHOOK CONTROL METHOD AND APPARATUS

FIELD OF THE INVENTION

This invention relates to systems for attenuating transmission of vibratory and similar forces between relatively movable members interconnected by a semi-active damper of the "continuously" or "infinitely" variable type. More specifically, the invention relates to methods for reducing undesirable shock forces or jerking which may, at times, be generated during operation of a system including a semi-active damper of the foregoing type.

BACKGROUND OF THE INVENTION

Semi-active dampers may be of the "off/on" type or of the "continuously" or "infinitely" variable type. A damper of the first type is switched, in accordance with the dictates of a suitable control policy, between alternative "on" and "off" damping states or conditions. In its on state, the damping coefficient and corresponding damping force of the damper is of a preselected relatively high magnitude. The term "damping coefficient," as used herein, means the relationship of the damping force generated by the damper to the relative velocity across the damper, which relationship is not necessarily linear. In its off state, the damping coefficient and the corresponding damping force of the damper is of relatively low magnitude. This may be approximately zero, but in many primary vehicle suspensions should be of a magnitude sufficiently greater than zero as to discourage "wheel hop." A continuously variable semi-active damper is also switched during operation between an off state, wherein its damping coefficient and corresponding damping force is approximately zero or of other low magnitude, and an on state. However, when a continuously variable damper is in its on state the damping coefficient and corresponding damping force thereof may be and normally is changed between a large (theoretically infinite) number of different magnitudes. If operated pursuant to a suitable control policy, a continuously variable semi-active damper may be caused to perform, when in its on state, in a manner similar to the hypothetical "sky-hook" damper discussed in an article by M. J. Crosby et al., entitled "Vibration Control Using Semi-Active Force Generators" and in U.S. Pat. No. 4,742, 998.

A known control policy for a continuously variable semi-active damper dictates that the damper be "on," and that the damping forces generated by it be proportional (although not necessarily linearly) to the absolute velocity of the supported member, when the sign of the product of such absolute velocity times the relative velocity between the supported and supporting members is positive, i.e., greater than zero. Contrarily, the policy dictates that the damper be set to its off state, in which the damping coefficient and damping force is of preselected low magnitude, when the sign of the aforesaid product is negative, i.e., when the product is less than zero. Generally comparable results may be achieved, particularly at relatively high frequency excitations, by use of an alternative control policy. The alternate control dictates that damping forces produced by the continuously variable semi-active damper be proportional to the relative displacement between the supported and supporting members at those times when the product of the relative velocity times the relative displacement between the members is less than zero, i.e., when the sign of the product is negative; and that the damping forces be of a low magnitude when the aforesaid product is greater than zero, i.e., when its sign is positive or plus.

Although generally producing good results, vibration attenuating systems having continuously variable semi-active damper means controlled in strict accordance with the control policies of the foregoing or similar types may experience shock forces of significant magnitude, i.e., a jerky feel, at some of the times when the damper is switched between its different damping states or conditions, due to system delays, estimation of control signals, or both. The aforesaid shocks may stress system components to such an extent as to shorten their useful life, and/or may cause the generation of objectionable noise or vibration. The problem of noise generation may be particularly apparent in automobile suspensions or other systems containing a resilient deformable member, such as an automobile tire, that is capable of storing energy upon deformation, and of abruptly releasing its stored energy when allowed to rapidly return toward an undeformed condition.

FIG. 1 is a block diagram of a known "skyhook" control policy for semi-active suspensions systems. This control policy requires two inputs and generates a single control output to drive a semi-active device, such as a controllable damper. The two inputs are absolute velocity ($V_{abs}$) on one side of the device and relative velocity ($V_{rel}$) across the device. These inputs may be sensed directly, estimated (integrated or differentiated) directly from sensor measurements, or estimated from sensor measurements and a dynamic system model.

The absolute velocity $V_{abs}$ is scaled by a positive factor gain G' in a gain block 13'. The absolute velocity $V_{abs}$ is also multiplied by the relative velocity signal $V_{rel}$ in a multiplier block 12a' to form the velocity product $V_{abs}*V_{rel}$. The velocity product signal is input to a logical test block 14'; the output of which is unity (1.0) or "true" when the input is positive, and zero or "false" otherwise. The output of the logical test block 14' is a gating signal 16' which is multiplied by the scaled absolute velocity signal 15' in a multiplier block 12b' to determine the appropriate desired damper force Fdesired'.

FIG. 2 is a three-dimensional control surface plot of desired damper force Fdesired' as a function of the two inputs $V_{abs}$ and $V_{rel}$ for the standard skyhook control policy as described above. Notably, a surface discontinuity 17' is present in the control surface 11' at $V_{rel}=0$. This surface discontinuity 17' may lead to an undesirable "jerk" or a "nervous feel" which may be experienced by passengers. FIG. 3 shows graphically (supported mass acceleration versus time) experimental data from a suspension system implementing the aforedescribed known "skyhook" control policy. Notably, the sharp vertical peaks 19 (only several of which are labeled) represented in the graph reflect behavior of the suspension system which may be experienced as "jerking."

U.S. Pat. No. 4,887,699 discloses a method for reducing the generation of undesirable shock forces and/or noise tending to occur in some vehicle suspension systems, or in other mounting systems, having at least one semi-active damper of the continuously variable type. Operation of the continuously variable damper is modified to include delaying some or all of the changes in the on/off states of the damper, and/or limiting the "rate and/or extent" of changes in the damping coefficient and thus the corresponding damping force of the damper at certain of the times when the damper is in an on state.

FIG. 4 is a three-dimensional plot of a control surface 11" illustrating the desired damper force Fdesired" of an exemplary control policy according to U.S. Pat. No. 4,887,699 as a function of the absolute velocity $V_{abs}$ of the supported mass and the relative velocity $V_{rel}$ across the suspension. Notably, the control surface 11", as shown, includes "creases", i.e., a slope discontinuity 18", in the quadrants where $V_{abs}*V_{rel}>0$. These "creases" or slope discontinuities in the Fdesired" control surface 11" may manifest as jerkiness similar to that experienced at $V_{rel}=0$ due to the surface discontinuity 17' for the aforedescribed standard skyhook control policy of

SUMMARY OF THE INVENTION

The present invention provides an improved control method and apparatus which reduce the generation of undesirable "jerking" in a suspension system including a controllable force generator.

The present invention is directed to a method of controlling a controllable force generator within a controllable suspension system interconnected between a first member $M_1$ and a second member $M_2$. The method includes the steps of obtaining a first signal ($V_{abs}$) representative of the absolute velocity of the first member $M_1$, obtaining a second signal ($V_{rel}$) representative of the relative velocity between the first and second members, and setting a damping force in the generator based upon a control policy which defines a control surface. The control policy includes a preselected gain, an absolute velocity, and a shaping function of relative velocity wherein the control surface exhibits continuous first derivatives for $V_{rel}*V_{abs}>0$ and the control surface is devoid of any surface discontinuities.

According to one embodiment of the method, the output force is equal to the product of the preselected gain, the absolute velocity, and the shaping function for products of $V_{abs}*V_{rel} \geq 0$. Preferably, the output force is equal to a selected minimum value for products of $V_{rel}*V_{abs}<0$.

The present invention is further directed to a controller for controlling a controllable force generator within a controllable suspension system interconnected between a first member $M_1$ and a second member $M_2$. The controller is operative to receive a first signal ($V_{abs}$) representative of the absolute velocity of the first member $M_1$ and a second signal ($V_{rel}$) representative of the relative velocity between the first and second members. The controller is further operative to set an output force in the generator based upon a control policy which defines a control surface. The control policy includes a preselected gain, an absolute velocity, and a shaping function of relative velocity wherein the control surface exhibits continuous first derivatives for $V_{rel}*V_{abs}>0$ and wherein the control surface is devoid of any surface discontinuities.

The present invention is further directed to a control system including the above-described controller. The control system includes means for generating a first signal ($V_{abs}$) representative of the absolute velocity of the first member $M_1$ and means for generating a second signal ($V_{rel}$) representative of the relative velocity between the first and second members.

The present invention is further directed to a controllable suspension system including a control system as described above. The controllable suspension system includes a controllable force generator interconnected between a first member $M_1$ and a second member $M_2$.

The present invention is further directed to a damped assembly including the above-described controllable suspension system. The assembly includes a first member $M_1$ and a second member $M_2$. The first and second members may be a vehicle body and a wheel. Alternatively, the first and second members may be a seat and a frame to which the seat is connected.

BRIEF DESCRIPTION OF THE DRAWINGS

Other features of the invention will be apparent from the following description of illustrative embodiments thereof, which should be read in conjunction with the accompanying drawings, in which.

DETAILED DESCRIPTION OF PREFERRED EMBODIMENT

Figure 5A:
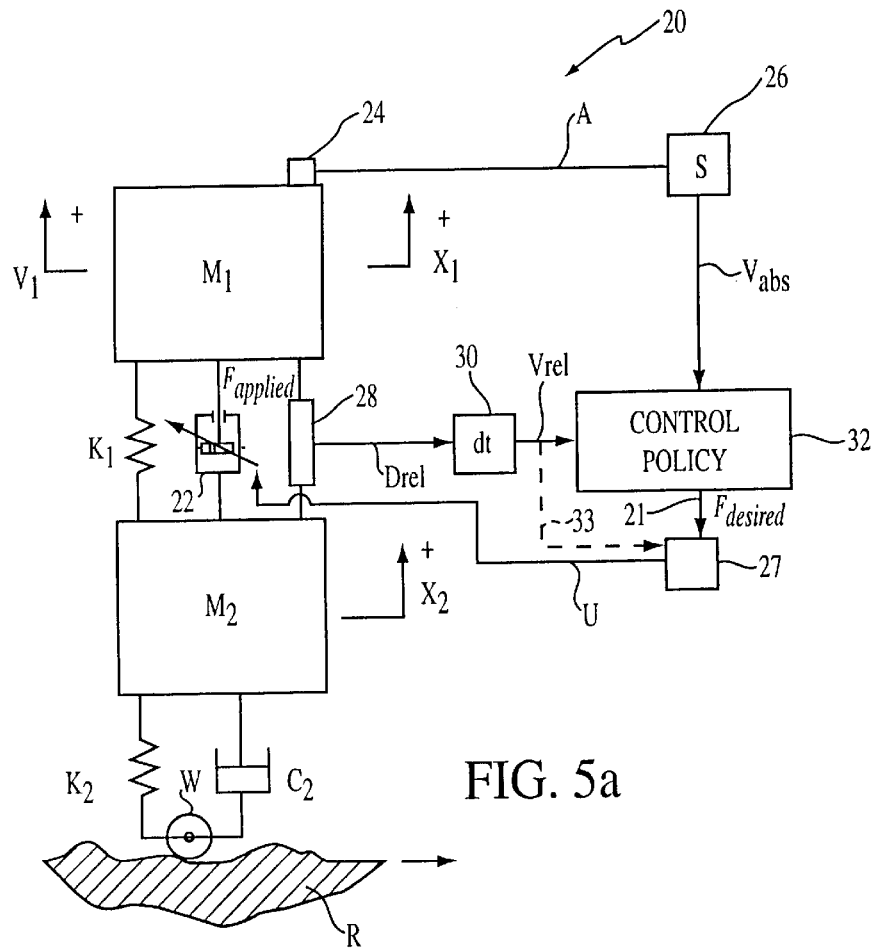
FIG. 5a is a schematic diagram of a semi-active suspension system according to the present invention as installed in a primary suspension.
Figure 5B:
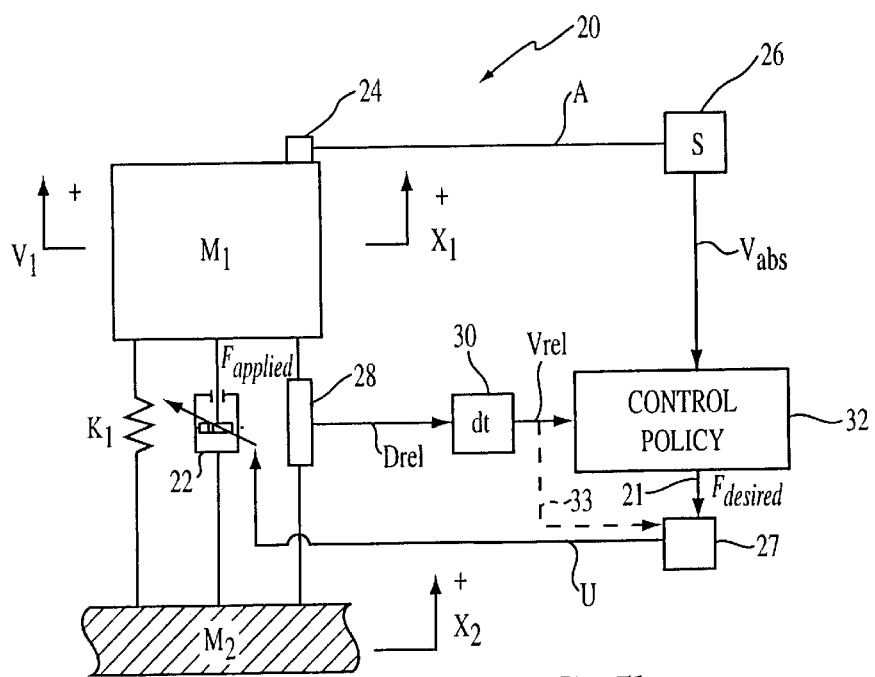
FIG. 5b is a schematic diagram of a semi-active suspension system according to the present invention as connected to a vibrating structure.

With reference to FIGS. 5a and 5b, a suspension or similar force-attenuating mounting system 20 according to the present invention is shown therein. The system 20 operates using a control policy according to the present invention particularly suited for minimizing jerkiness in the effective force attenuation of the system 20. The system 20 may be used, by way of example, in primary vehicle suspensions, vehicle cab suspensions, seat suspensions, isolation tables, tuned mass dampers, or the like.

The system 20 interconnects vertically spaced and relatively movable supported member $M_1$ and supporting member $M_2$. By way of example, the members $M_1$, $M_2$ may respectively be body and frame components (e.g., including a lower arm, wheel and tire) of an automobile or other motor vehicle that is supported upon a road or similar surface R by conventional resiliently deformable tire members as shown in FIG. 5a. In another example, the members $M_1$, $M_2$ of the system 20 may respectively be a seat suspended relative to a floor structure as shown in FIG. 5b. A primary function of the suspension system such as system 20 of FIG. 5a might be to isolate the supported member $M_1$ insofar as possible from vibratory and/or other forces transmitted to the member $M_2$ by such things as road-surface irregularities, etc. Similarly, the primary function of a seat suspension system, such as system 20 of FIG. 5b, might be to isolate the supported member $M_1$ insofar as possible from vibratory and/or other forces transmitted from the supporting member $M_2$ (the vehicle body or other structure).

The designations $X_1$ and $X_2$ respectively designate the absolute vertical displacements of the supported member $M_1$ and the supporting member $M_2$; it being arbitrarily indicated that these are positive when in an upward direction and negative when in a downward direction. The designation $V_1$ designates the absolute velocity of the member $M_1$, it being arbitrarily indicated that this is positive when in an upward direction and negative when in a downward direction. When the system 20 is at rest, $V_1$ is zero and $X_1$ and $X_2$ are constant.

The system 20 includes a primary suspension spring $K_1$ and a controllable force generator 22, preferably a controllable damper. The system 20 of FIG. 5a may include a secondary spring $K_2$ and a non-controllable damper $C_2$, for example as embodied in a tire having spring constant and internal hysteresis damping. The rotating contact wheel w graphically illustrates that the spring $K_2$ and damper $C_2$ are tied together in parallel relation and rest on the road surface R. Contrarily, the supporting member $M_2$ of FIG. 5b is itself the source of the vibrating base input.

The primary suspension spring $K_1$ and the controllable generator 22 extend in substantially parallel relationship to each other between the members $M_1$, $M_2$ and are connected to such members. While only a single spring/damper set is shown, in a primary suspension system such as shown in FIG. 5a more may be provided.

In the system 20, the controllable generator 22 may be, for example, a hydraulic piston-and-cylinder type damper. In a damper of this type, a piston rod and a cylinder of the damper are secured to respective ones of the supported and supporting members $M_1$, $M_2$ by suitable connectors. Relative vertical movement between the members $M_1$, $M_2$ causes relative vertical movement between the rod and the cylinder, which in turn displaces hydraulic fluid between variable volume chambers of the damper via an electrically or otherwise rapidly adjustable control valve forming part of a hydraulic circuit interconnecting such chambers. Suitable controllable generators 22 may be, for example, a damper of the orifice-setting type where a parameter of the orifice, such as its diameter, is changed to effect the damping; a controllable fluid damper, such as a electrorheological fluid or magnetorheological fluid damper where a field applied to a controllable fluid changes the fluid rheology; or any other suitable controllable generator or mount. It will be appreciated from the description herein that other types of dampers may be used and alternative suitable controllable generators will be apparent to those of skill in the art.

The generator 22 is preferably of the "continuously variable" type. It is rapidly switchable between an "off" damping state or condition in which the damping coefficient or damping factor C and the corresponding damping force of the damper is set to a relatively low magnitude (which in some cases is approximately zero), and an "on" state wherein the damping coefficient and corresponding damping force of the damper may be caused to be of any desired ones of a large (theoretically infinite) number of higher magnitudes. Changes in the damping state of the damper result from control signals U that are imparted to the controllable valve that cause the valve to throttle or restrict fluid flow through the valve to the extent indicated by the signals. The valve may be of mechanical, electrorheological, magnetorheological or any other type capable of rapid operation in the foregoing manner.

The control signals U for controlling the controllable generator 22 are provided by a controller 32. The controller 32 preferably includes a suitably programmed microprocessor or micro-controller or other suitable device for carrying out a predetermined control policy. The electronic controller 32 receives signals from a first sensor 24, such as an accelerometer and a second sensor 28, such as a relative displacement sensor. The sensor 24 is suitably mounted to measure and generate electrical signals A corresponding to the acceleration of the member $M_1$. An integrator 26 integrates the acceleration signal A to calculate or estimate the absolute velocity $V_1$ of the member $M_1$ and generates a corresponding absolute velocity signal $V_{abs}$ which is received by the controller 32. The second sensor 28 is suitably mounted to measure the relative displacement $(X_1-X_2)$ between the members $M_1$, $M_2$ and generates a corresponding relative displacement signal $D_{rel}$. A filter 30 differentiates the relative displacement signal $D_{rel}$ to calculate or estimate the relative velocity of the members $M_1$, $M_2$ and generates a corresponding relative velocity signal $V_{rel}$. The filter 30 preferably approximates the differential of the input signal. As should be readily apparent, the filter 30 and/or the integrator 26 may be included in the controller 32.

Suitable devices for serving as sensors 24, 28, integrator 26, filter 30, and controller 32 will be readily apparent to those of skill in the art upon reading the description herein. Moreover, alternative suitable devices or combinations of devices may be used in place of the described devices. For example, the displacement sensor 28 and the filter 30 may be replaced with a relative velocity sensor, such as a Linear Velocity Transducer (LVT). Likewise, the first sensor 24 and the integrator 26 may be replaced with a velocimeter or other suitable sensor for directly providing a signal $V_{abs}$ representative of absolute velocity $V_1$ of $M_1$.

The controller 32 is preprogrammed to operate in accordance with a prescribed control policy, as described in detail hereinafter. The controller 32 processes the signals $V_{abs}$ and $V_{rel}$ according to the prescribed control policy to provide an output signal 21 to the controllable generator 22 corresponding to a desired damping force Fdesired. A suitable transformer 27 converts the output signal 21 representative of the desired damping force Fdesired to a signal U useable by the generator 22. By way of example, the transformer 27 may convert the output signal 21 to a current or voltage. Moreover, the transformer 27 may include a function which is dependent upon $V_{rel}$ as indicated by dotted line 33. This is required when Fapplied is a function of both U and $V_{rel}$. For example, if the generator 22 is a controllable viscous damper, the applied damping force Fapplied may vary with relative velocity $V_{rel}$. Having the transformer 27 include a function of $V_{rel}$ allows the force generator 22 to produce a force that is as close as desirable to the desired force Fdesired by accounting for any dependency thereon. The controllable generator 22 responds to the control signal U by generating the applied damping force Fapplied. Preferably, the applied force Fapplied is substantially equal to the desired Force Fdesired. It will be appreciated that the applied force Fapplied generated by the force generator 22 may differ slightly from the desired damping force Fdesired as a result of various conditions affecting the performance of the force generator 22.

Figure 6:
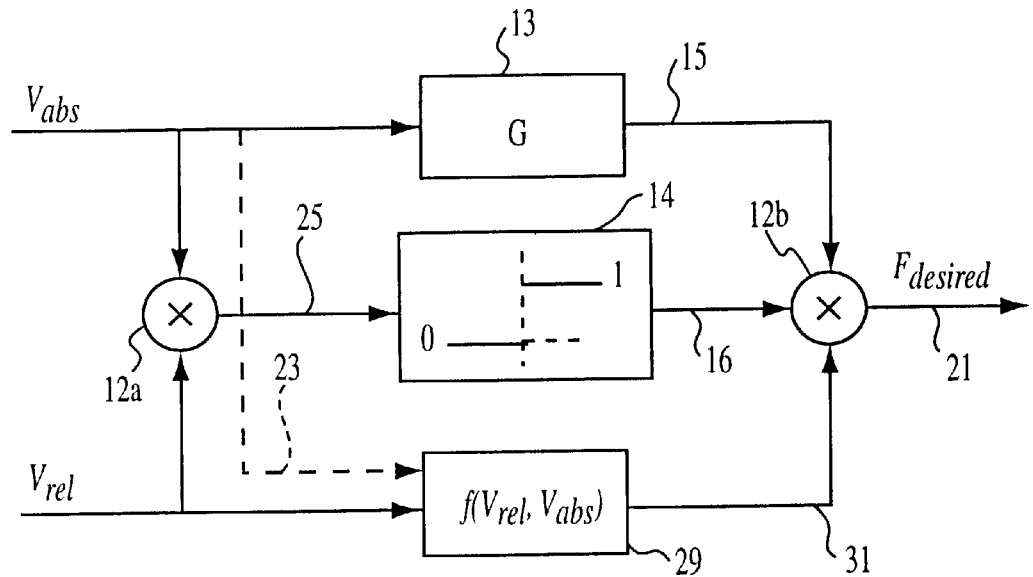
FIG. 6 is a diagram of a generalized control law according to the present invention which may be used in the semi-active suspension system of FIG. 5.

Generally, and with reference to FIG. 6, the inputs to the preselected control policy according to the invention are $V_{abs}$ and $V_{rel}$. Additionally, a gain value G and other suitable constants may be set. The control policy dictates that for products of $V_{abs}$ and $V_{rel}$ greater than or equal to zero, the desired damping force Fdesired will be equal to the product of the chosen gain G times $V_{abs}$ in line 15 times a chosen shaping function of $V_{rel}$ (and which may also be a function of $V_{abs}$) which has continuous first derivatives for products of $V_{rel}$ and $V_{abs}$ greater than zero. For products of $V_{abs}$ and $V_{rel}$ less than zero exiting multiplier block 12a in line 25, the damping force Fdesired will equal zero or some other preselected minimum value. Restated, the damping force Fdesired and, thus, the control surface will be defined and set according to the following control policy:

Fdesired=$G*V_{abs}*f(V_{rel}$ whose control surface exhibits continuous first derivatives for all values of $V_{rel}*V_{abs}>0$ and where the control surface is devoid of any surface discontinuities) if $V_{abs}*V_{rel} \geq 0$; and Fdesired=0 (or another prescribed minimum value) if $V_{abs}*V_{rel}<0$.

FIG. 6 is a block diagram representing the present invention control policy set forth above and as embodied in the controller 32. The absolute velocity signal $V_{abs}$ is scaled by the gain G, a positive factor, in a gain block 13. The absolute velocity signal $V_{abs}$ is also multiplied by the relative velocity signal $V_{rel}$ in a multiplier block 12a to form a velocity product signal 25 (i.e., $V_{abs}*V_{rel}$) which is input to a logical test block 14. The output of the logical test block 14 is unity (1.0) or "true" if the signal 25 is positive (i.e., $V_{abs}*V_{rel}$ is positive) and is zero or "false" if the signal 25 is negative (i.e., $V_{abs}*V_{rel}$ is negative). The output of the logical test block 14 is a gating signal 16 which is multiplied by the scaled absolute velocity signal 15 (i.e., $G*V_{abs}$) and also by a shaping signal 31 in the multiplier block 12b.

The shaping signal 31 is generated by a suitably designed shaping function 29 which is dependent on the relative velocity signal $V_{rel}$. Optionally, as indicated by dotted line 23 in FIG. 6, the shaping function 29 may also be dependent on the absolute velocity signal $V_{abs}$, as well. The shaping function $f(V_{rel}, V_{abs})$ of block 29 may be implemented as a lookup table or a mathematical equation which may be evaluated by a processor of the controller 32.

The multiplier 12b generates the output signal 21 directly corresponding to the appropriate desired damping force Fdesired of the damper 22. A suitable transformer 27 (see FIG. 5a and 5b) receives the output signal 21 and transforms the output signal 21 to the control signal U which is appropriate to cause the damper 22 (or other type of force generator) to rapidly apply the damping force Fapplied between the masses $M_1$, $M_2$. The transformer 27 is shown separate from the controller 32 for clarity, but may form a part of the controller 32 if desired. Moreover, for some types of force generators, the transforming step may be incorporated into the control policy so that the isolated transformer 27 is not needed. As discussed above, the control signal U is received by the controllable generator 22 which, in response, provides the damping force Fapplied across the masses $M_1$, $M_2$.

The shaping function $f(V_{rel}, V_{abs})$ will define the overall shape of the three-dimensional control surface 11. In selecting the shaping function $f(V_{rel}, V_{abs})$, the following guidelines should be observed:

a. $f(V_{rel}, V_{abs})$ is a continuous function;

b. $f(V_{rel}=0, V_{abs})$ is equal to 0;

c. $f(V_{rel}, V_{abs})$ and the control surface both include continuous first derivatives (i.e., no slope discontinuities) for all values of $V_{rel}$ and $V_{abs}$ where $V_{rel}*V_{abs}>0$; and d. $f(V_{rel}, V_{abs})$ and the control surface both are devoid of surface discontinuities.

Preferably, also:

e. $f(V_{rel}, V_{abs})$ will equal 1.0 or unity almost everywhere.

Figure 1:
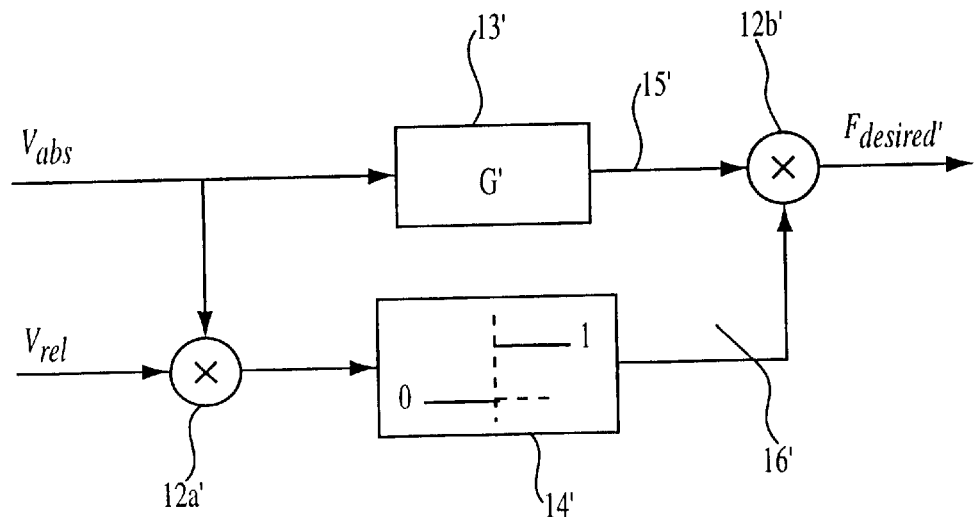
FIG. 1 is a diagram showing a standard skyhook control policy of the prior art.
Figure 2:
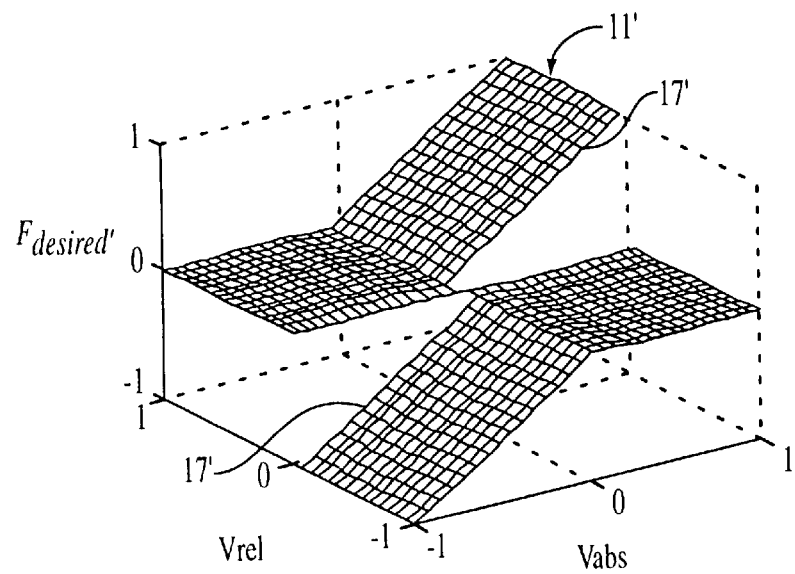
FIG. 2 is a three-dimensional plot showing a control surface for a semi-active suspension system using the control policy of FIG. 1.

By "a function of the relative velocity $V_{rel}$ having continuous first derivatives for all values of $V_{rel}*V_{abs}>0$" it is meant that there are no slope discontinuities on the control surface 11 for these values. For example, any crease in the control surface 11 where there is a step change in the rate of change of damping force Fdesired as defined by the control surface over an infinitesimal change in $V_{rel}$ would constitute a slope discontinuity. Further, the surface 11 must include no surface discontinuities. A "surface discontinuity" in the context of the FIG. 2 embodiment is present where for an incremental change in $V_{rel}$ away from $V_{rel}=0$ for any value of $V_{abs} \neq 0$, the value of damping force Fdesired instantaneously jumps to a non-zero value. A good example of surface discontinuity 17' is shown in Prior Art FIG. 2.

According to a first preferred embodiment, the shaping function 29 is:

$$f(V_{rel}, V_{abs}) = |V_{rel}|.$$

Restated, for this shaping function the control policy becomes:

$$Fdesired = G*V_{abs}*V_{rel} \quad \text{if } V_{abs}*V_{rel} \geq 0; \text{ and}$$

Fdesired=0 (or another prescribed minimum value)

if $V_{abs}*V_{rel}<0$.

Figure 7:
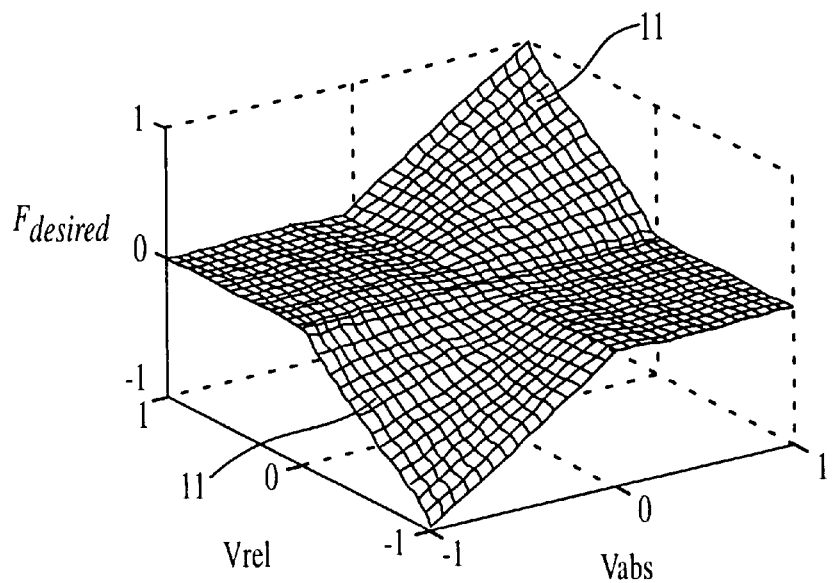
FIG. 7 is a three-dimensional plot showing a control surface for a semi-active suspension system using a control policy according to a first embodiment of the present invention.

FIG. 7 is a three-dimensional control surface plot showing the resulting control surface of the control policy described immediately above. Notably, this control policy is devoid of any surface discontinuity near $V_{rel}=0$, thereby reducing the manifestation of jerking in the suspension system 20.

Figure 3:
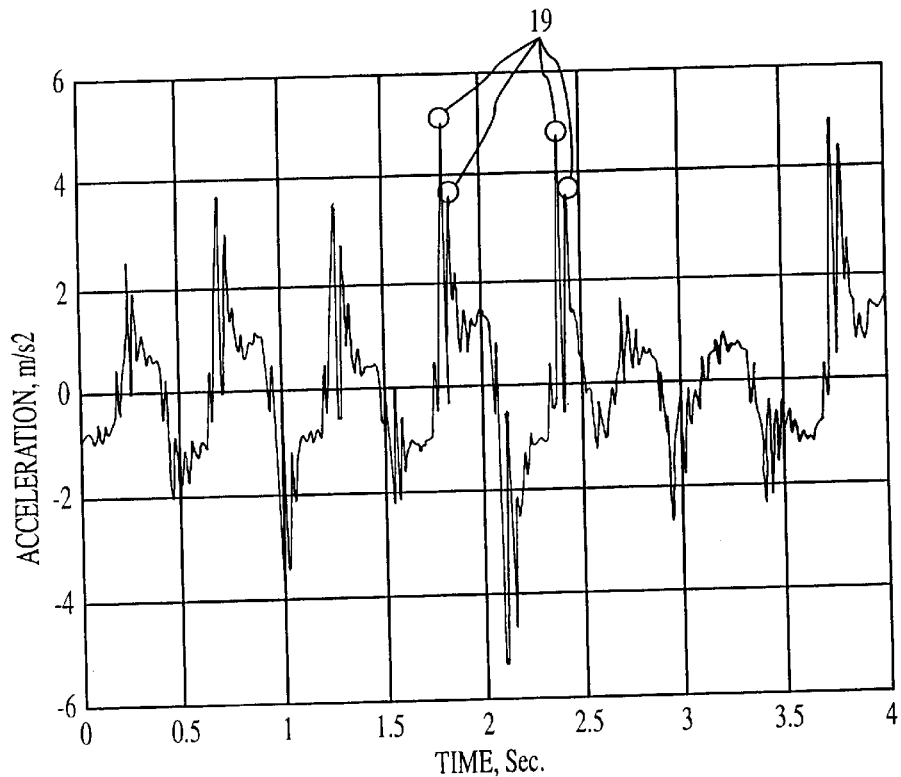
FIG. 3 is a two-dimensional graph showing the acceleration over time of a mass suspended in a semi-active suspension system using the control policy of FIG. 1.
Figure 4:
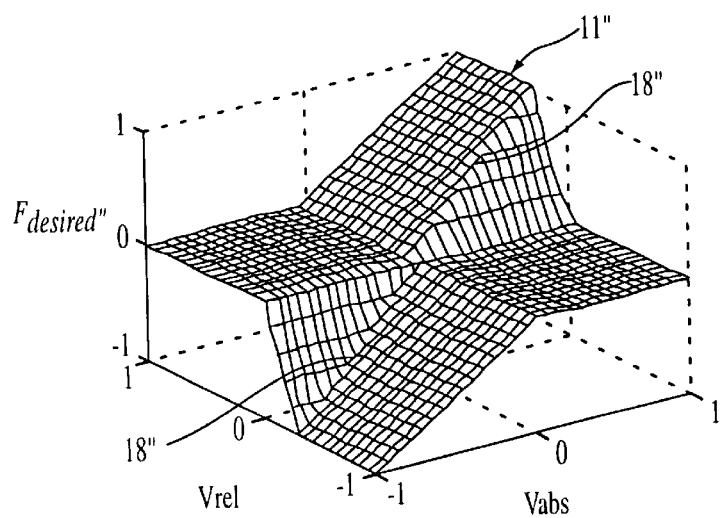
FIG. 4 is a three-dimensional plot showing a control surface for a semi-active suspension system using a modified control policy according to the prior art.
Figure 8:
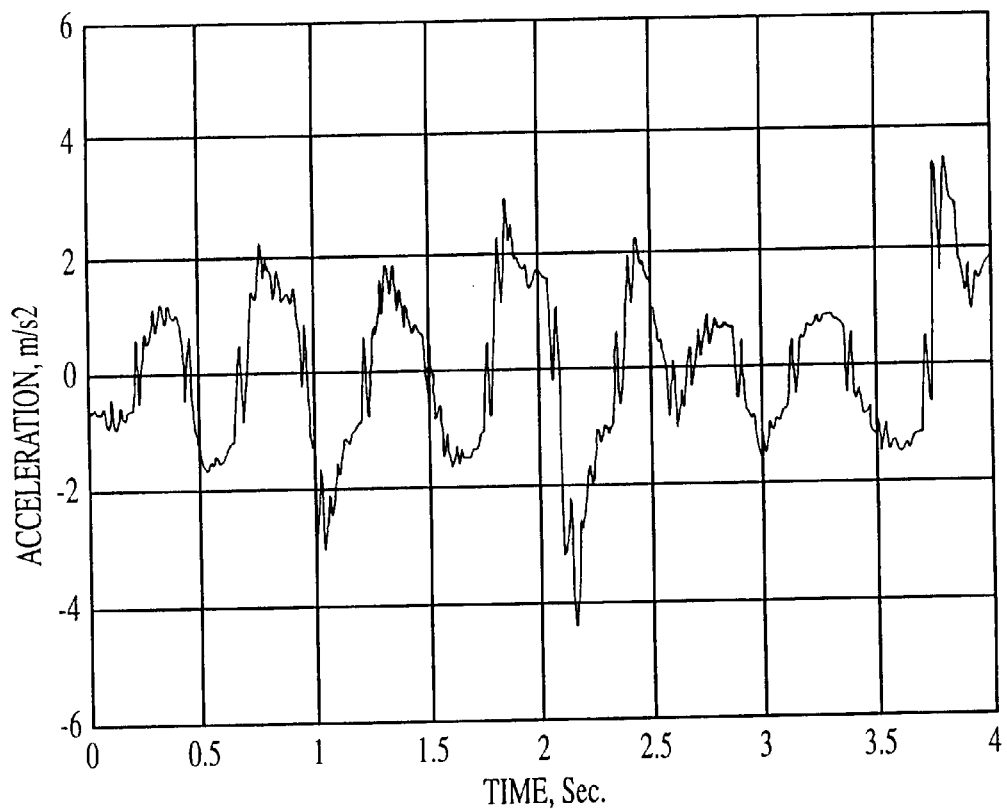
FIG. 8 is a two-dimensional graph showing the acceleration over time of a mass suspended in a semi-active suspension system using the control policy of FIG. 7.

FIG. 8 shows a two-dimensional graph showing the acceleration over time of a mass suspended in a semi-active suspension system employing this control policy. Notably, as compared to the graph of FIG. 3 for a standard skyhook control policy, the sharp vertical peaks are substantially reduced. However, this shaping function also presents some distortion for large values of $|V_{rel}|$, which may be undesirable in some applications.

According to a second preferred embodiment, the shaping function is:

$$f(V_{rel}, V_{abs}) = \left[1 - \exp\left(\frac{-|V_{rel}|}{V_o}\right)\right],$$

where $V_o$ is a positive value velocity tuning constant which may be selectively chosen based upon experience to shape the control surface 11 as desired. Restated, for this second embodiment shaping function 29, the control policy becomes:

$$Fdesired = G*V_{abs}*\left[1 - \exp\left(\frac{-|V_{rel}|}{V_o}\right)\right]$$

if $V_{abs}*V_{rel} \geq 0$;

and

Fdesired=0 (or another prescribed minimum value) if $V_{abs}*V_{rel}<0$.

Figure 9:
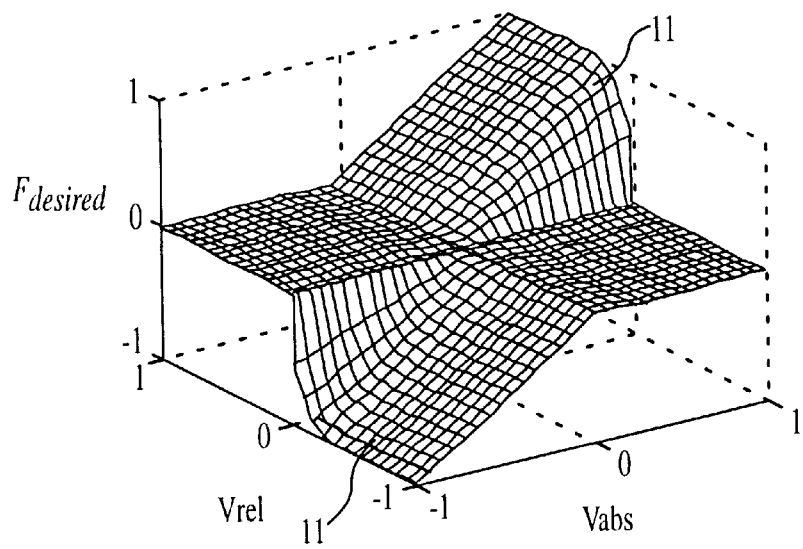
FIG. 9 is a three-dimensional plot showing a control surface for a semi-active suspension system using a control policy according to a second embodiment of the present invention.

FIG. 9 is a three-dimensional plot showing the resulting control surface 11 of this control policy. Notably, this control policy effectively eliminates the surface discontinuity near $V_{rel}=0$. Additionally, the shaping only affects the control surface near $V_{rel}=0$ and does not excessively distort the control surface away from $V_{rel}=0$ thereby the control mimics skyhook but avoids the adverse effects of its discontinuities.

As an additional variation of the shaping function 29 of FIG. 6, the shaping function may, for example, be a function of both $V_{rel}$ and $V_{abs}$. According to a third preferred embodiment, the shaping function for this variation is:

$$f(V_{rel}, V_{abs}) = \left[1 - \exp\left(\frac{-|V_{abs} * V_{rel}|}{V_o}\right)\right]$$

Restated, for this third embodiment shaping function 29, the control policy becomes:

$$Fdesired = G * V_{abs} * \left[1 - \exp\left(\frac{-|V_{abs} * V_{rel}|}{V_o}\right)\right]$$

if $V_{abs} * V_{rel} \geq 0$;

and

Fdesired=0 (or another prescribed minimum value) if $V_{abs}*V_{rel}<0$.

While certain preferred shaping functions have been described hereinabove, it is contemplated that various other shaping functions may be employed in accordance with the present invention. While certain shaping functions will provide preferred performance, it is only necessary that the chosen shaping function be devoid of the aforementioned slope and surface discontinuities in order to reduce the tendency for jerking.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of controlling a controllable force generator within a controllable suspension system interconnected between a first member $M_1$ and a second member $M_2$, comprising the steps of:
   a. obtaining a first signal ($V_{abs}$) representative of the absolute velocity of the first member $M_1$,
   b. obtaining a second signal ($V_{rel}$) representative of the relative velocity between the first and second members, and
   c. setting a desired damping force for said generator based upon a control policy which defines a control surface, said control policy including a preselected gain, said absolute velocity, and a function of said relative velocity wherein said control surface exhibits continuous first derivatives for all values of $V_{rel}*V_{abs}>0$ and wherein said control surface is devoid of surface discontinuities.

2. The method of claim 1 wherein the controllable force generator is a controllable damper.

3. The method of claim 1 wherein said desired damping force is equal to a product of said preselected gain, said absolute velocity, and said function, for products of $V_{abs}*V_{rel} \geq 0$.

4. The method of claim 3 wherein said desired damping force is equal to a selected minimum value for products of $V_{rel}*V_{abs}<0$.

5. The method of claim 3 wherein said function is defined as:

function=$|V_{rel}|$.

6. The method of claim 3 wherein said function is defined as:

$$\text{function} = \left[1 - \exp\left(\frac{-|V_{rel}|}{V_o}\right)\right].$$

7. The method of claim 3 wherein said function is defined as:

$$\text{function} = \left[1 - \exp\left(\frac{-|V_{abs} * V_{rel}|}{V_o}\right)\right].$$

8. A control system for controlling a controllable force generator within a controllable suspension system interconnected between a first member $M_1$ and a second member $M_2$, said control system, comprising:
   a. means for generating a first signal ($V_{abs}$) representative of the absolute velocity of the first member $M_1$,
   b. means for generating a second signal ($V_{rel}$) representative of the relative velocity between the first and second members, and
   c. a controller operative to receive said first signal ($V_{abs}$) and said second signal ($V_{rel}$) and to set a desired damping force for said generator based upon a control policy which defines a control surface, said control policy including a preselected gain, said absolute velocity, and a function of said relative velocity wherein said control surface exhibits continuous first derivatives for all values of $V_{rel}*V_{abs}>0$ and wherein said control surface is devoid of surface discontinuities.

9. The control system of claim 8 wherein said means for generating a first signal ($V_{abs}$) includes an accelerometer.

10. The control system of claim 9 wherein said means for generating a first signal ($V_{abs}$) further includes an integrator.

11. The control system of claim 8 wherein said means for generating a second signal ($V_{rel}$) includes a relative displacement sensor.

12. The control system of claim 11 wherein said means for generating a second signal ($V_{rel}$) further includes a filter operative to approximate the differential of a signal from said relative displacement sensor.

13. The control system of claim 8 wherein said controller is operative to generate an output signal corresponding to said desired damping force, said control system including a transforming means operative to convert said output signal to a control signal which is effective to cause said controllable force generator to provide an applied damping force between said first and second members.

14. A controllable suspension system interconnected between a first member $M_1$ and a second member $M_2$, said controllable suspension system, comprising:

a. a controllable force generator; and b. a control system comprising:

means for generating a first signal ($V_{abs}$) representative of the absolute velocity of the first member $M_1$, means for generating a second signal ($V_{rel}$) representative of the relative velocity between the first and second members, and a controller operative to receive said first signal ($V_{abs}$) and said second signal ($V_{rel}$) and to set a desired damping force for said generator based upon a control policy which defines a control surface, said control policy including a preselected gain, said absolute velocity, and a function of said relative velocity wherein said control surface exhibits continuous first derivatives for all values of $V_{rel}*V_{abs}>0$ and wherein said control surface is devoid of surface discontinuities.

15. A damped assembly, comprising:

a. a first member $M_1$;

b. a second member $M_2$; and c. a controllable suspension system including:

a controllable force generator interconnected between said first member $M_1$ and said second member $M_2$; and a control system comprising:

means for generating a first signal ($V_{abs}$) representative of the absolute velocity of the first member $M_1$, means for generating a second signal ($V_{rel}$) representative of the relative velocity between said first and second members, and a controller operative to receive said first signal ($V_{abs}$) and said second signal ($V_{rel}$) and to set a desired damping force for said generator based upon a control policy which defines a control surface, said control policy including a preselected gain, said absolute velocity, and a function of said relative velocity wherein said control surface exhibits continuous first derivatives for all values of $V_{rel}*V_{abs}>0$ and wherein said control surface is devoid of surface discontinuities.

16. The assembly of claim 15 wherein said controllable force generator includes a controllable damper.

17. The assembly of claim 15 wherein said first member $M_1$ includes a vehicle body and said second member $M_2$ includes a vehicle wheel.

18. The assembly of claim 15 wherein said first member $M_1$ includes a seat and said second member $M_2$ includes a frame to which said seat is connected.

19. A controller for controlling a controllable force generator within a controllable suspension system interconnected between a first member $M_1$ and a second member $M_2$, said controller operative to receive a first signal ($V_{abs}$) representative of the absolute velocity of the first member $M_1$, and a second signal ($V_{rel}$) representative of the relative velocity between the first and second members, and to set a desired damping force for said generator based upon a control policy which defines a control surface, said control policy including a preselected gain, said absolute velocity, and a function of said relative velocity wherein said control surface exhibits continuous first derivatives for all values of $V_{rel}*V_{abs}>0$ and wherein said control surface is devoid of surface discontinuities.

* * * * *